United States Patent [19]

Hall, Jr.

[11] 4,092,628

[45] May 30, 1978

[54] SEISMIC TRANSDUCER UNIT FOR MARSHY TERRAINS

[75] Inventor: Ernest M. Hall, Jr., Houston, Tex.

[73] Assignee: Western Geophysical Co. of America, Houston, Tex.

[21] Appl. No.: 704,148

[22] Filed: Jul. 12, 1976

[51] Int. Cl.[2] ........................ G01V 1/00; H04B 13/00; H04R 15/00

[52] U.S. Cl. ........................ 340/10; 340/8 S; 181/122

[58] Field of Search ..................... 340/7 R, 8 S, 8 LF, 340/8 R, 9, 10, 17 R; 181/101, 125, 122; 310/8.4, 8.5

[56] References Cited

U.S. PATENT DOCUMENTS

| | | | |
|---|---|---|---|
| 2,384,465 | 9/1945 | Harrison | 340/8 LF |
| 2,925,582 | 2/1960 | Mattei et al. | 340/10 X |
| 3,255,431 | 6/1966 | Howatt | 340/10 |
| 3,586,889 | 6/1971 | Kolter | 340/10 X |
| 3,932,834 | 1/1976 | Sutherland | 340/8 R |

*Primary Examiner*—Maynard R. Wilbur
*Assistant Examiner*—T. M. Blum
*Attorney, Agent, or Firm*—William A. Knox

[57] ABSTRACT

The transducer unit includes a rigid hollow casing. The casing defines through its cylindrical wall a plurality of sound-transmitting windows. A hydrophone having an elastomer core is removably positioned in the bore of the casing opposite to the windows. A pressure transducer element is embedded inside the core. The core is slightly compressed so as to form plugs for the windows.

1 Claim, 5 Drawing Figures

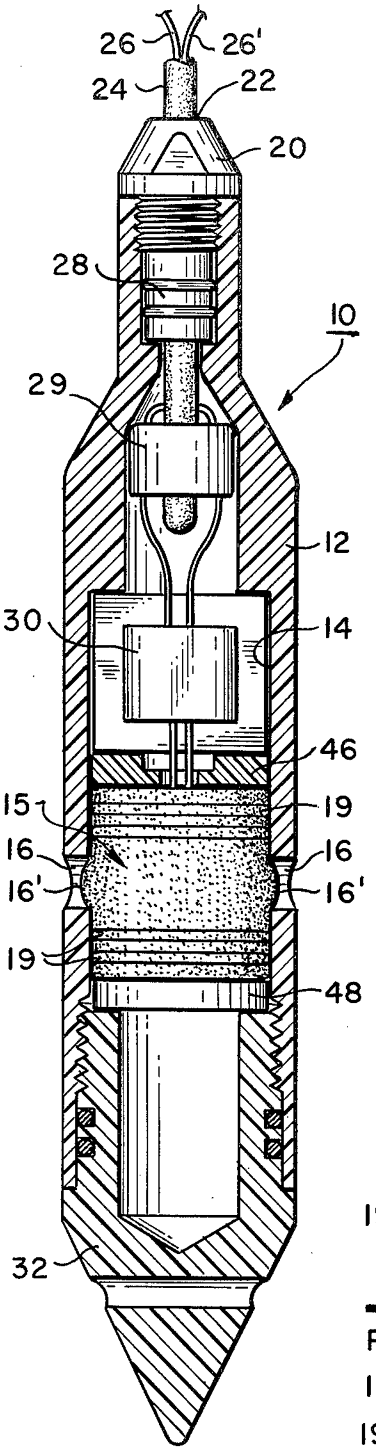
FIG. 1.
FIG. 4.
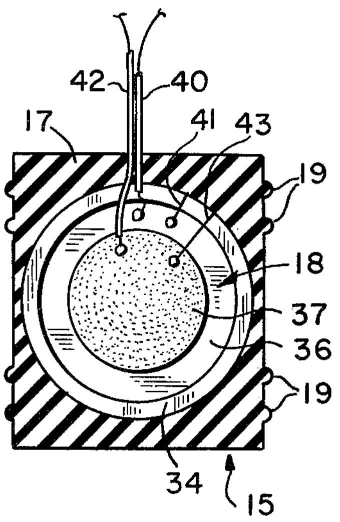
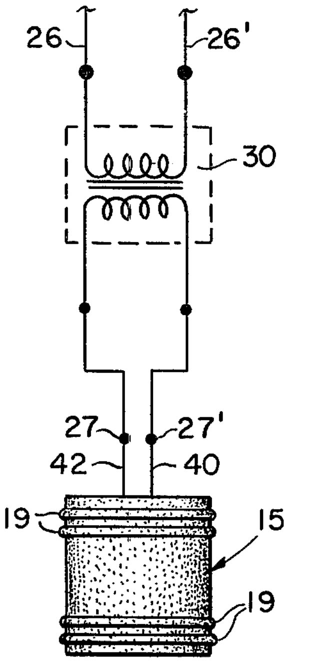
FIG. 5.
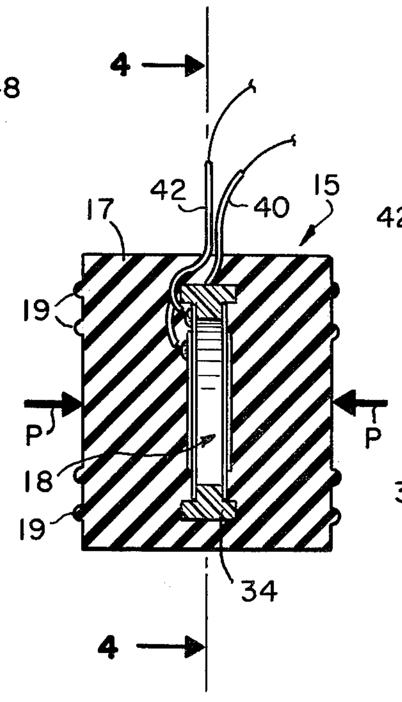
FIG. 3.
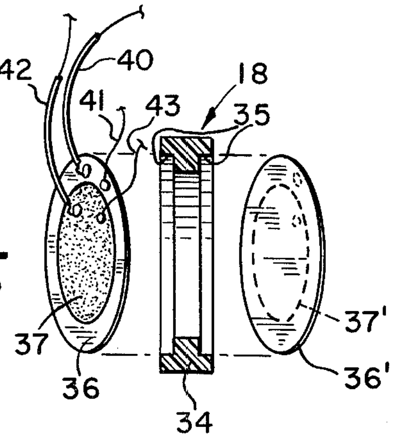
FIG. 2.

SEISMIC TRANSDUCER UNIT FOR MARSHY TERRAINS

BACKGROUND OF THE INVENTION

Seismic pressure transducers adapted for marshy terrains are known and widely used. One such pressure transducer unit comprises a hollow cylindrical perforated casing defining an inner cavity. An air-filled bag or bladder containing a pressure transducer element is mounted inside the cavity. The bag is made from a sound-transmitting material such as rubber. When the transducer unit is submerged in shallow water or marshy ground, the water fills the cavity through the perforations of the casing. Seismic pressure waves from the liquid are transmitted to the pressure transducer element through the wall of the bag and the air therein.

Such known seismic transducer units have certain drawbacks chief among which are: the wall of the rubber bladder has to be relatively thin in order not to unduly attenuate the arriving seismic pressure waves. But, a thin-walled bladder is susceptible of becoming easily damaged by sharp objects piercing through the perforations of the casing. When the bladder becomes ruptured, the air therefrom escapes, water enters the inner volume of the bladder and damages the transducer element. Another serious problem with such prior art transducer units is that mud enters the cavity of the casing and forms a "cake" around the bladder, thereby preventing effective acoustic coupling between the external fluid medium and the transducer element.

In U.S. Pat. No. 3,932,834, assigned to the same assignee, is shown an improved transducer unit which comprises a casing defining a cavity and having sound-transmitting windows for acoustically coupling the cavity with a fluid medium surrounding the casing. At least one pressure transducer element is mounted inside the cavity. A core completely fills the cavity and supports the transducer element in place. The core transmits the pressure wave energy from the fluid medium to the transducer element.

This invention is an improvement over the transducer unit described in said patent.

SUMMARY OF THE INVENTION

This invention relates to a seismic transducer unit for converting acoustic energy in a fluid medium into electric energy. The transducer unit includes a rigid hollow casing having a conical end cap to facilitate positioning the casing in the ground. The casing defines through its cylindrical wall a plurality of soundtransmitting windows. A hydrophone having an elastomer core is removably positioned in the bore of the casing opposite to the windows. A pressure transducer element is embedded inside the core. The core is slightly compressed so as to form plugs for the windows.

BRIEF DESCRIPTION OF THE DRAWINGS

FIG. 1 is a view in elevation, partly in section, of one embodiment of a transducer unit in accordance with the invention;

FIG. 2 is an exploded view, partly in section, of the transducer element used for converting compression waves into electric signals;

FIG. 3 is a sectional view of the hydrophone shown in FIG. 1;

FIG. 4 is a view along line 4—4 on FIG. 3; and

FIG. 5 shows the wiring diagram of the transducer unit.

DESCRIPTION OF THE PREFERRED EMBODIMENT

In one embodiment, the transducer unit 10 comprised a hollow cylindrical casing 12 made of a rigid material which can be metal or plastic. Casing 12 has a cylindrical bore 14 communicating with a plurality of angularly spaced openings or windows 16. Each window can be a cylindrical opening.

Removably mounted inside bore 14 is a hydrophone 15 having an elastomer core 17 in which is embedded a pressure transducer element 18. The elastomer core 17 is preferably symmetrically positioned relative to a transverse plane passing through windows 16. Casing 12 has an upper end cap 20 defining a center bore 22 for receiving an electric cable 24 having at least a pair of electric conductors 26–26'.

While in the embodiment shown it is desired to connect the output terminals 27–27' from the hydrophone to the electric conductors 26–26' through a transformer 30, the transformer can be eliminated.

An anchor 29, preferably of the type shown in U.S. Pat. No. 3,931,453, assigned to the same assignee, will prevent tension from becoming transmitted by cable 24 to hydrophone 15 or transformer 30. A water seal 28 prevents water from entering through end cap 20. A threaded conical bottom end cap 32 is provided to allow the transducer unit 10 to more easily penetrate into marshy ground.

Hydrophone 15 is made by totally encapsulating the pressure transducer element 18 in the elastomer core 17 which serves as a pressure-transmitting support for the transducer element 18 and as a plug 16' to seal windows 16 against moisture penetration into bore 14.

The mold which receives the encapsulating elastomer is provided with top and bottom circular grooves such that the encapsulant forms O-rings 19 which improves the sealing function of the core. The elastomer material should be sufficiently flexible, relatively incompressible and have a hardness in the approximate range of 40 to 90 on the Shore A scale. It should have good thermal stability between −50° F and +200° F. Typical of sound-transmitting materials that might be employed are natural rubber, synthetic rubber, silicon rubber, urethanes, flexible epoxys, etc. Silicon rubber can be employed having a hardness of 45 on the Shore A Scale, a tensile strength of 400 psi., and an elongation of 180%. The material should be water-impervious to prevent water penetration into cavity 14. Silicon rubber can be purchased as a two-part liquid. Prior to pouring into the mold's cavity, the liquids are mixed together and the entrapped air is removed as by using vacuum techniques. Thereafter, the liquid mixture is cured using well-known methods.

A preferred type material for the encapsulant is SILGAN type H-621 manufactured by Stauffer Wacker Silicons with a tear strength of about 100 lbs. per inch. The hardness of the material is about 60 on the Shore A scale.

The transducer element 18 comprises a spacer ring 34 having two counter bores 35 at each end adapted to receive circular conductive substrate discs 36, 36' made of brass or beryllium copper. The discs serve as supports as well as electrodes for crystals 37, 37', respectively. The separation between the circular discs is on the order of 0.050 and 0.150 mils so as to allow the discs to flex in response to impinging pressure waves P. The discs 36, 36' are connected in parallel by wire 41 and the crystals are connected in parallel by wire 43. Wire 40 connects the substrates 36, 36' to output terminal 27', and wire 42 connects the crystals 37, 37' to output terminal 27.

It is desired for the core 17 to become slightly compressed in order to improve the coupling to the transducer element 18 and to form the radially and outwardly-extending plugs 16' which partially fill and completely seal the windows 16. This is accomplished by sandwiching the core 17 between top and bottom discs 46, 48 and exerting a compressive force between the discs with the threaded end cap 32. The convex, radially and outwardly projecting plugs 16' become exposed through the windows 16 for contact with the surrounding fluid medium. There is thus established a smooth profile to the outside of casing 12, and at the same time neither mud nor water can penetrate into bore 14. The diameter of core 17 is such that even if the core material were cut or scratched through the windows 16, the operation of the crystals would not be adversely impaired. The hydrophone would still continue to convert acoustic energy, transmitted from the surrounding medium to the crystals through the solid core 17, into electric energy.

Although this invention has been described with reference to a presently preferred embodiment, it will be apparent to those skilled in the art that the advantages of this invention can be embodied in other structural forms. Among the advantages derived from the present invention are the following: the elastomer core 17 when slightly compressed between the discs 46, 48 greatly enhances the acoustic energy transmission qualities between the ambient fluid medium and the crystal assembly 18, with a negligible loss of signal level in the elastomer itself; the elastomer, being under compression, establishes good contact between the elastomer and the crystals; the elastomer when compressed provides good seals 16' against the windows 16 and the sealing function is adequate even without the O-rings 19 which provide redundant protection; the compression on the core can be adjustably controlled by the threaded end cap 32; and release of compression by unscrewing the end cap 32 makes it easy to remove from or install a hydrophone 15 in the casing 12.

Accordingly, the transducer unit 10 of this invention is easily serviceable in the field since all the internal components are removable which is a considerable advantage over the transducer unit described in said U.S. Pat. No. 3,932,834. Also, the hydrophone 15 can be constructed from relatively inexpensive materials by relatively unskilled workers and the assembly of the entire transducer unit 10 can be made following relatively simple procedures.

The tear strength of the elastomer is selected such that it can be removed from the mold without damage to the O-rings 19 and to resist splitting, cutting or tearing as the core is installed in the casing and subjected to normal abuse.

The core is installed inside the casing and becomes compressed in a longitudinal direction. This causes the elastomer to expand in a radial direction forcing the O-rings 19 to establish a better seal against the inner wall of bore 14. In the event that the seal provided by plugs 16' around one or more of the windows 16 should fail, then the top and bottom O-rings 19 will prevent moisture from passing beyond the O-rings, causing damage to the electrical connections.

It is often necessary to replace the transducer's leader cable 24 since in typical field use, the leader cable becomes cut and/or its insulation eaten up by rodents. To replace the leader's wires 26, 26', it is necessary to disassemble the parts of the transducer unit 10. In accordance with this invention, the hydrophone 15 can be easily removed from and inserted into the casing 12 without sacrifice to the transducer characteristics of the unit 10.

What is claimed is:

1. In a seismic transducer unit for detecting pressure variations in a surrounding fluid medium, said transducer unit including a hollow, rigid casing having an inner bore and defining in its wall at least one sound-transmitting window and a conical bottom end cap detachably coupled to said casing, the improvement comprising:

a hydrophone assembly removably disposed inside said bore, said hydrophone assembly including an elastomer core and a crystal assembly embedded in said core, said core serving to transmit sound waves to the crystal assembly; and means for adjustably compressing said core so that portions of said core expand radially outwardly, effecting sealing engagement against the wall of said bore, and blocking the surrounding fluid from penetrating into the bore of said casing past the sealing engagement.

* * * * *